(12) United States Patent
Treitlinger et al.

(10) Patent No.: US 12,020,239 B2
(45) Date of Patent: Jun. 25, 2024

(54) METHOD AND SYSTEM FOR CONVERSION OF DIGITAL ASSETS TO FIAT CURRENCY

(71) Applicant: Mastercard International Incorporated, Purchase, NY (US)

(72) Inventors: Thomas Treitlinger, Dublin (IE); Jose Pereira, Dublin (IE); Eduardo Andrade, Dublin (IE); Sébastien Le Callonnec, Greystones (IE); Lauren Grendon, Dublin (IE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 18/095,248

(22) Filed: Jan. 10, 2023

(65) Prior Publication Data
US 2023/0169495 A1 Jun. 1, 2023

Related U.S. Application Data

(63) Continuation of application No. 17/325,705, filed on May 20, 2021, now Pat. No. 11,556,922.

(51) Int. Cl.
*G06Q 20/00* (2012.01)
*G06Q 20/38* (2012.01)
(Continued)

(52) U.S. Cl.
CPC ....... *G06Q 20/381* (2013.01); *G06Q 20/3825* (2013.01); *G06Q 20/3829* (2013.01); *G06Q 20/389* (2013.01); *G06Q 20/4014* (2013.01); *G06Q 40/02* (2013.01); *H04L 9/008* (2013.01); *H04L 9/3247* (2013.01)

(58) Field of Classification Search
CPC .............. G06Q 20/381; G06Q 20/3825; G06Q 20/3829; G06Q 20/389; G06Q 20/4014; G06Q 40/02; G06Q 20/02; G06Q 20/065; G06Q 20/223; G06Q 20/3678; G06Q 20/3827; G06Q 20/401; G06Q 20/4016;
(Continued)

(56) References Cited

U.S. PATENT DOCUMENTS

| 2018/0096175 A1 | 4/2018 | Schmeling et al. | |
| 2018/0276666 A1* | 9/2018 | Haldenby | H04L 9/3268 |

* cited by examiner

*Primary Examiner* — Dante Ravetti
(74) *Attorney, Agent, or Firm* — Panitch Schwarze Belisario & Nadel LLP

(57) ABSTRACT

A method for conversion of digital assets to fiat currency using a secondary blockchain and mirrored accounting includes: receiving transaction data corresponding to a first blockchain transaction processed using a first blockchain, the transaction data including a payer identifier, recipient identifier, and blockchain currency amount; validating an entity as an authorized entity associated with the payer identifier; determining a fiat currency amount based on the blockchain currency amount; generating a second blockchain transaction, the second blockchain transaction including an unspent transaction output, destination address associated with the authorized entity, and the blockchain currency amount and/or the fiat currency amount; confirming addition of the second blockchain transaction to a second blockchain; and initiating a transfer for the fiat currency amount from a first transaction account to a second transaction account, the second transaction account being associated with the authorized entity.

18 Claims, 7 Drawing Sheets

(51) Int. Cl.
*G06Q 20/40* (2012.01)
*G06Q 40/02* (2023.01)
*H04L 9/00* (2022.01)
*H04L 9/32* (2006.01)

(58) Field of Classification Search
CPC ..... H04L 9/008; H04L 9/3247; H04L 9/3297; H04L 9/50
See application file for complete search history.

METHOD AND SYSTEM FOR CONVERSION OF DIGITAL ASSETS TO FIAT CURRENCY

FIELD

The present disclosure relates to the conversion of digital assets to fiat currency, specifically the use of a secondary blockchain and mirrored accounting to enable reliable and auditable conversion of a digital asset to a fiat currency.

BACKGROUND

Blockchain was initially created as a storage mechanism for use in conducting payment transactions with a cryptographic currency. Using a blockchain provides a number of benefits, such as decentralization, distributed computing, transparency regarding transactions, and yet also providing anonymity as to the individuals or entities involved in a transaction. One of the more popular aspects of a blockchain is that it is an immutable record: every transaction ever that is part of the chain is stored therein and cannot be changed due to the computational requirements and bandwidth limitations, particularly as a chain gets longer and a blockchain network adds more nodes.

Transactions conducted using a blockchain are made via an exchange of a digital asset associated with that blockchain, such as Bitcoin, Ethereum, etc. Many merchants may be willing to cater to consumers by offering to accept payment via such a digital asset. However, with current methods it is significantly more difficult for a merchant to exchange their digital assets for a fiat currency than it is for exchanging different fiat currencies. Most often, conversion of digital assets is performed using an exchange. A merchant or other interested party will transfer their digital assets to a wallet as directed by the exchange using a new blockchain transaction. The exchange will then pay a corresponding amount in fiat currency to an account provided by the merchant or other interested party, minus a fee collected by the exchange.

Unfortunately, due to the technologies involved such processes can be significantly time consuming, particularly due to the constraints of many public blockchains where the transfer of digital assets often takes place. Additionally, exchanges are not regulated institutions and do not have to provide any transparency or accountability, which can result in merchants being taken advantage of or being apprehensive to accept digital asset payments due to the difficulties and dangers in converting their assets to fiat currency. Thus, there is a need for a more efficient, secure, and trustworthy conversion of digital assets to fiat currency.

SUMMARY

The present disclosure provides a description of systems and methods for conversion of digital assets to fiat currency using a secondary blockchain and mirrored accounting. A computing device monitors transactions that are performed using a blockchain, which may be a public blockchain, for transfers of digital assets. When a merchant or other registered entity makes a transaction using a known account used for conversion, the computing device may detect such a transaction and initiate a conversion process. The conversion process may include validating the identity of the recipient of the digital assets, determination of the equivalent fiat currency to be paid, and the conducting of a mirrored transaction on a secondary blockchain using mirrored accounts. The secondary transaction may serve as an immutable record kept by the computing device for the digital asset conversion, to provide for auditability of asset conversions. Once the secondary transaction is confirmed, the computing device may initiate payment of fiat currency for the determined amount to the recipient, resulting in a successful conversion for the recipient without the need for an exchange and in a manner that is more trustworthy and efficient than in traditional systems.

A method for conversion of digital assets to fiat currency using a secondary blockchain and mirrored accounting includes: receiving, by a receiver of a computing device, transaction data corresponding to a first blockchain transaction processed using a first blockchain, the transaction data including at least a payer identifier, a recipient identifier, and a blockchain currency amount; validating, by a processor of the computing device, an entity as an authorized entity associated with the payer identifier; determining, by the processor of the computing device, a fiat currency amount based on at least the blockchain currency amount; generating, by the processor of the computing device, a second blockchain transaction, the second blockchain transaction including at least an unspent transaction output, a destination address associated with the authorized entity, and one of the blockchain currency amount and the fiat currency amount; confirming, by the processor of the computing device, addition of the second blockchain transaction to a second blockchain; and initiating, by a transmitter of the computing device, a transfer for the fiat currency amount from a first transaction account to a second transaction account, the second transaction account being associated with the authorized entity.

A system for conversion of digital assets to fiat currency using a secondary blockchain and mirrored accounting includes: a computing device including a receiver receiving transaction data corresponding to a first blockchain transaction processed using a first blockchain, the transaction data including at least a payer identifier, a recipient identifier, and a blockchain currency amount, a processor validating an entity as an authorized entity associated with the payer identifier, determining a fiat currency amount based on at least the blockchain currency amount, generating a second blockchain transaction, the second blockchain transaction including at least an unspent transaction output, a destination address associated with the authorized entity, and one of the blockchain currency amount and the fiat currency amount, and confirming addition of the second blockchain transaction to a second blockchain, and a transmitter initiating a transfer for the fiat currency amount from a first transaction account to a second transaction account, the second transaction account being associated with the authorized entity.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
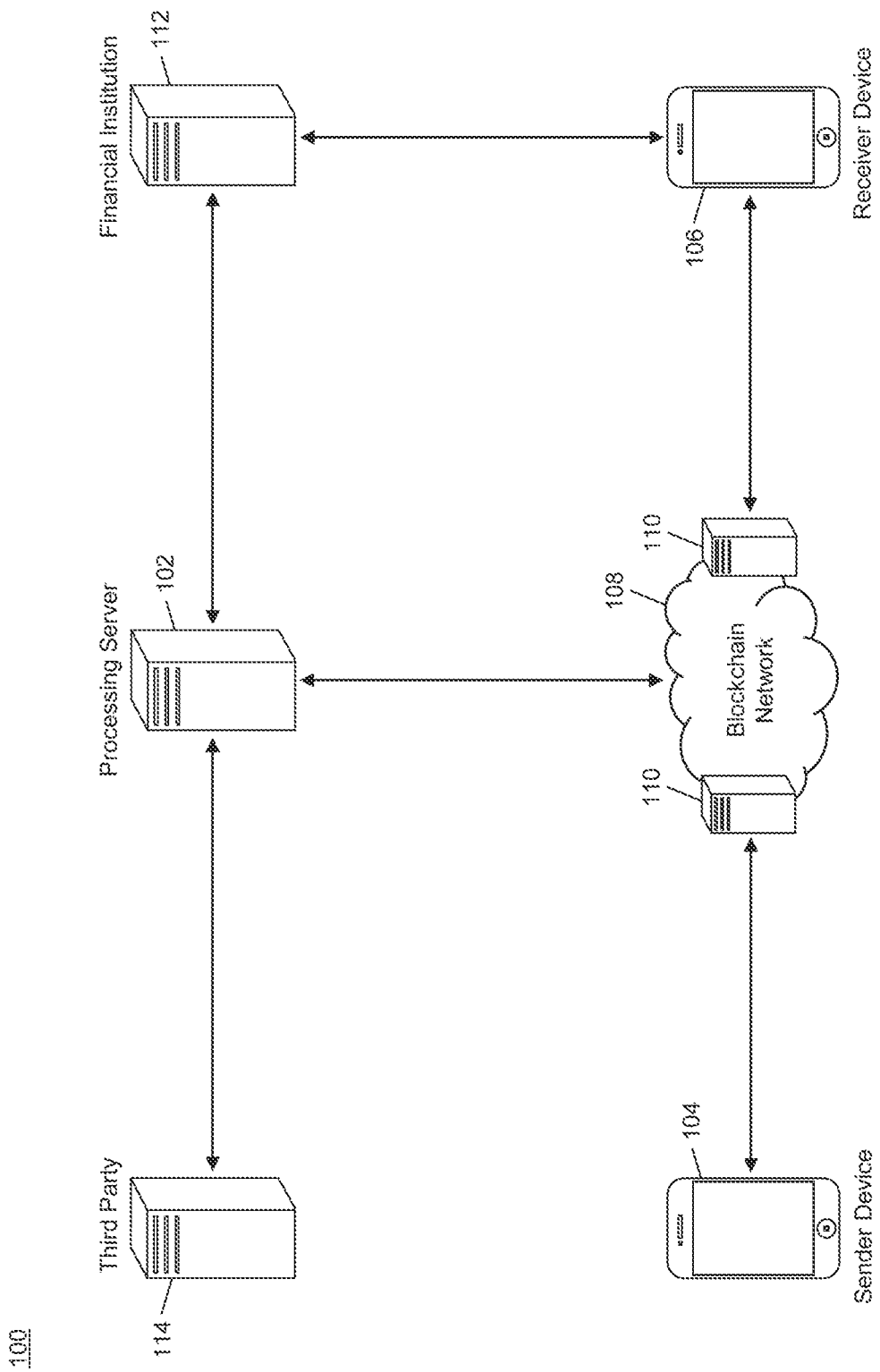
FIG. 1 is a block diagram illustrating a high-level system architecture for conversion of digital assets to fiat currency in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Issuer—An entity that establishes (e.g., opens) a letter or line of credit in favor of a beneficiary, and honors drafts drawn by the beneficiary against the amount specified in the letter or line of credit. In many instances, the issuer may be a bank or other financial institution authorized to open lines of credit. In some instances, any entity that may extend a line of credit to a beneficiary may be considered an issuer. The line of credit opened by the issuer may be represented in the form of a payment account and may be drawn on by the beneficiary via the use of a payment card. An issuer may also offer additional types of payment accounts to consumers as will be apparent to persons having skill in the relevant art, such as debit accounts, prepaid accounts, electronic wallet accounts, savings accounts, checking accounts, etc., and may provide consumers with physical or non-physical means for accessing and/or utilizing such an account, such as debit cards, prepaid cards, automated teller machine cards, electronic wallets, checks, etc. In some instances, as used herein, the term "issuer" may refer to an apparatus or device of an issuer entity.

System for Conversion of Digital Assets to Fiat Currency

FIG. 1 illustrates a system 100 for the conversion of digital assets to a fiat currency using a secondary blockchain and mirrored accounting.

The system 100 may include a processing server 102. The processing server 102, discussed in more detail below, may be configured to convert digital assets, such as a blockchain currency used in transactions made via a blockchain, to a fiat currency for merchants and other entities involved in digital asset transactions. In the system 100, two parties may agree to conduct a blockchain transaction using a blockchain for the transfer of digital assets from one party two another. As illustrated in FIG. 1, the blockchain transaction may take place between a sender device 104 as the payer and a receiver device 106 as the payee, where the devices represent the computing devices used to facilitate the blockchain transaction on behalf of entities.

Figure 5:
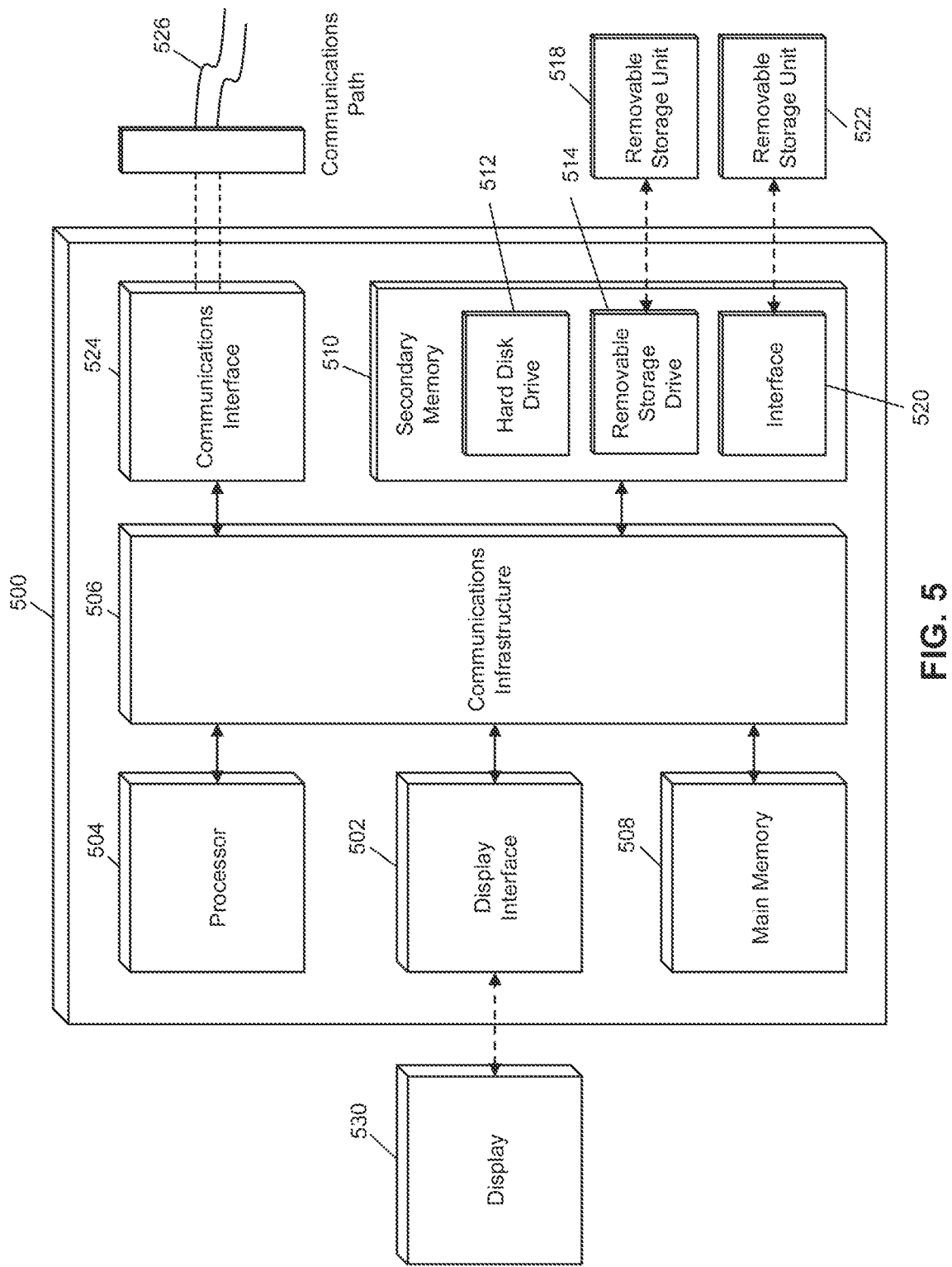
FIG. 5 is a block diagram illustrating a computer system architecture in accordance with exemplary embodiments.

The blockchain transaction itself may be processed via the use of a blockchain network 108. The blockchain network 108 may be comprised of a plurality of blockchain nodes 110. Each blockchain node 110 may be a computing system, such as illustrated in FIG. 5, discussed in more detail below, that is configured to perform functions related to the processing and management of the blockchain, including the generation of blockchain data values, verification of proposed blockchain transactions, verification of digital signatures, generation of new blocks, validation of new blocks, and maintenance of a copy of the blockchain.

The blockchain may be a distributed ledger that is comprised of at least a plurality of blocks. Each block may include at least a block header and one or more data values. Each block header may include at least a timestamp, a block reference value, and a data reference value. The timestamp may be a time at which the block header was generated and may be represented using any suitable method (e.g., UNIX timestamp, DateTime, etc.). The block reference value may be a value that references an earlier block (e.g., based on timestamp) in the blockchain. In some embodiments, a block reference value in a block header may be a reference to the block header of the most recently added block prior to the respective block. In an exemplary embodiment, the block reference value may be a hash value generated via the hashing of the block header of the most recently added block. The data reference value may similarly be a reference to the one or more data values stored in the block that includes the block header. In an exemplary embodiment, the data reference value may be a hash value generated via the hashing of the one or more data values. For instance, the block reference value may be the root of a Merkle tree generated using the one or more data values.

The use of the block reference value and data reference value in each block header may result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single blockchain node 110 in the blockchain network 108 prior to the generation and addition of a new block to the blockchain in order for the change to be made permanent. Computational and communication limitations may make such a modification exceedingly difficult, if not impossible, thus rendering the blockchain immutable.

In some embodiments, the blockchain may be used to store information regarding blockchain transactions conducted between two different blockchain wallets. A blockchain wallet may include a private key of a cryptographic key pair that is used to generate digital signatures that serve as authorization by a payer for a blockchain transaction, where the digital signature can be verified by the blockchain network 108 using the public key of the cryptographic key pair. In some cases, the term "blockchain wallet" may refer specifically to the private key. In other cases, the term "blockchain wallet" may refer to a computing device (e.g., sender device 104 and receiver device 106) that stores the private key for use thereof in blockchain transactions. For instance, each computing device may each have their own private key for respective cryptographic key pairs and may each be a blockchain wallet for use in transactions with the blockchain associated with the blockchain network. Computing devices may be any type of device suitable to store and utilize a blockchain wallet, such as a desktop computer, laptop computer, notebook computer, tablet computer, cellular phone, smart phone, smart watch, smart television, wearable computing device, implantable computing device, etc.

Each blockchain data value stored in the blockchain may correspond to a blockchain transaction or other storage of data, as applicable. A blockchain transaction may consist of at least: a digital signature of the sender of currency (e.g., a sender device 104) that is generated using the sender's private key, a blockchain address of the recipient of currency (e.g., a receiver device 106) generated using the recipient's public key, and a blockchain currency amount that is transferred or other data being stored. In some blockchain transactions, the transaction may also include one or more blockchain addresses of the sender where blockchain currency is currently stored (e.g., where the digital signature proves their access to such currency), as well as an address generated using the sender's public key for any change that is to be retained by the sender. Addresses to which cryptographic currency has been sent that can be used in future transactions are referred to as "output" addresses, as each address was previously used to capture output of a prior blockchain transaction, also referred to as "unspent transactions," due to there being currency sent to the address in a prior transaction where that currency is still unspent. In some cases, a blockchain transaction may also include the sender's public key, for use by an entity in validating the transaction. For the traditional processing of a blockchain transaction, such data may be provided to a blockchain node 110 in the blockchain network 108, either by the sender or the recipient. The node may verify the digital signature using the public key in the cryptographic key pair of the sender's wallet and also verify the sender's access to the funds (e.g., that the unspent transactions have not yet been spent and were sent to address associated with the sender's wallet), a process known as "confirmation" of a transaction, and then include the blockchain transaction in a new block. The new block may be validated by other nodes in the blockchain network 108 before being added to the blockchain and distributed to all of the blockchain nodes 110 in the blockchain network 108 in traditional blockchain implementations. In cases where a blockchain data value may not be related to a blockchain transaction, but instead the storage of other types of data, blockchain data values may still include or otherwise involve the validation of a digital signature.

In the system 100, the two entities may conduct a blockchain transaction for digital assets from one entity to another using respective sender device 104 and receiver device 106. The transaction may be processed as discussed above using the blockchain of the blockchain network 108, referred to herein as a "first blockchain" or "primary blockchain." The entity that received the digital assets (e.g., represented in the system 100 by the receiver device 106) may be interested in converting those digital assets to fiat currency. In order to initiate such a conversion, the receiver device 106 may submit a new blockchain transaction using the blockchain network 108 for transfer of the amount of digital assets the entity wishes to convert to a blockchain address associated with the processing server 102 or otherwise known to the processing server 102 as used for conversion. In some cases, blockchain addresses suitable for receiving conversion transactions may be known to receiver devices 106 (e.g., publicly available by the processing server 102 or otherwise communicated to the receiver device 106 previously). In other cases, the receiver device 106 may request a blockchain address from the processing server 102 using a suitable communication method (e.g., via an application programming interface, application program request, etc.), where the processing server 102 may generate such an address using a public key of a blockchain wallet used to receive digital assets in the primary blockchain associated with the blockchain network 108. Once the receiver device 106 has the address, the receiver device 106 may initiate a blockchain transaction on the first blockchain for payment of the desired amount of digital assets to the blockchain address.

The processing server 102 may be configured to monitor activity involving any blockchain wallets used for digital asset conversion. In some cases, the processing server 102 may be a blockchain node 110 in the blockchain network 108 and may receive transaction data accordingly for monitoring of activity. In other cases, the primary blockchain may be a public blockchain, where the processing server 102 may retrieve blocks and blockchain transaction data using an application programming interface or other suitable method. In still other cases, one or more blockchain nodes 110 may be configured to report blocks and/or blockchain transaction data to the processing server 102. In some such instances, the blockchain node(s) 110 may be provided with blockchain addresses, blockchain wallet data, or other information for use in monitoring, such as to only provide the processing server 102 with blockchain transaction data relevant to blockchain wallets of interest to the processing server 102 (e.g., those used for digital asset conversion).

When the processing server 102 detects that a transfer has been made from the receiver device 106 to a blockchain wallet for conversion, the processing server 102 may initiate its conversion process. The conversion process may consist of four distinct steps: verification of the requesting entity, determination of the fiat currency amount, conducting of a secondary blockchain transaction, and payment of fiat currency.

In the first step, the processing server 102 may verify the identity of the entity that is requesting the conversion of digital assets, such as the entity associated with the receiver device 106. The entity may be verified using any suitable method, such as a traditional "know your customer" method. In some embodiments, the entity may be unknown to the processing server 102 prior to the request, where the verification may include collecting relevant data from the entity and attempting to verify the entity. In other embodiments, the entity may be registered with the processing server 102 prior to requesting the conversion. In such an embodiment, the verification may be used to ensure that the entity requesting the conversion is the same as the registered entity, such as by providing a password, passcode, one-time password, or some other proof of identity. In some embodiments, the processing server 102 may handle the verification directly. In other embodiments, a third party 114 may be used. In such embodiments, the processing server 102 may provide any data necessary to the third party 114, and the third party 114 may perform a verification process and return a result to the processing server 102.

Any suitable data available to the processing server 102 may be used in the verification. For instance, in cases where the entity has been previously registered, the entity may have provided the processing server 102 with identifying data or other information that may be used in the verification (e.g., provided to the third party 114 in the verification request). In some instances, the processing server 102 may have received or otherwise identified an identifier that is assigned to the entity (e.g., to the receiver device 106 or the blockchain wallet associated therewith), where that identifier may be used in verification processes. For example, the processing server 102 may have the identifier associated with the blockchain wallet in a database therein and may provide that identifier to the third party 114. In some such cases, the processing server 102 may not possess any other data identifying the entity, such as to maintain anonymity and privacy for the entity and may instead rely on the third party 114 for verification.

If the verification of the entity is unsuccessful, the processing server 102 may refrain from performing the digital asset conversion. In some such cases, the processing server 102 may return the digital assets to the receiver device 106 through a new blockchain transaction on the first blockchain. If the verification is successful, the processing server 102 may continue on in its conversion process by determining the amount of fiat currency that is to be provided to the requesting entity as part of the conversion. The amount may be determined directly by the processing server 102 using an exchange rate or other available data or may be determined by a third party 114 and provided to the processing server 102 upon request. For example, the third party 114 may be an exchange that monitors and/or sets exchange rates for various fiat currencies and/or digital assets, and may provide the processing server 102 with an exchange rate from the digital currency used by the requesting entity to its desired fiat currency or with the fiat currency amount if provided the digital asset amount by the processing server 102. In some cases, the fiat currency amount may be affected by fees, rules and regulations of applicable jurisdictions, applicable laws, etc. For instance, laws or regulations may limit the amount of digital assets that may be converted or fiat currency that may be transferred. In some instances, the amount of fiat currency being transferred may require reporting or other actions to be taken by the processing server 102 or an associated entity, such as based on government laws or regulations, which may be handled using methods and systems that will be apparent to persons having skill in the relevant art.

Once the fiat currency amount has been determined, the processing server 102 may proceed to the next step in the conversion process: conducting a secondary blockchain transaction. In the system 100, a secondary blockchain, also referred to herein as the "second blockchain," may be utilized by the processing server 102 to serve as a record of all digital asset conversion transactions. In some instances, the secondary blockchain may be a private blockchain or a permissioned blockchain, where the processing server 102 may be a blockchain node configured to perform functions related to the secondary blockchain.

The secondary blockchain may be used by the processing server 102 to mirror the digital asset conversion transactions that are processed using the first blockchain. The processing server 102 may establish mirrored accounts for use in the secondary blockchain, where each mirrored account is a blockchain wallet that directly corresponds to a blockchain wallet that operates using the primary blockchain. For instance, in the above example, the processing server 102 may have a first mirrored account for the blockchain wallet of the receiver device 106 used to transfer digital assets and a second mirrored account for the blockchain wallet of the processing server 102 that is used to receive the digital assets. The mirrored accounts may be maintained by the processing server 102 and used for record keeping. In instances where entities are registered with the processing server 102 prior to requesting digital asset conversion, the processing server 102 may create the mirrored account for an entity during the registration process. The processing server 102 may maintain records, such as account profiles stored therein, that directly associated an entity and/or blockchain wallet with its mirrored account (e.g., the corresponding blockchain wallet in the secondary blockchain).

When a digital asset conversion is requested, the processing server 102 may identify the mirrored accounts for the payer and payee in the digital asset conversion transaction conducted using the first blockchain. The processing server 102 may then generate a blockchain transaction for the secondary blockchain that mirrors the transaction that was added to the primary blockchain. In some embodiments, the secondary transaction may include a transfer of digital assets that mirrors (e.g., with the same value or an equivalent value) the transfer made in the primary blockchain. In other embodiments, the secondary blockchain may not be used for any digital asset transfer but may instead be used as an immutable record. For instance, the transaction generated for the secondary blockchain may be used to store data regarding the transaction conducted using the primary blockchain. Such data may include, for instance, the identity or other data associated with the requesting entity (e.g., of the receiver device 106) and the digital asset amount and/or fiat currency amount. In some cases, additional data may be stored therein, such as a timestamp from the initial blockchain transaction on the primary blockchain, information associated with the blockchain wallet used to receive the digital assets, exchange rate, third party 114 that performed the verification and/or fiat currency determination, etc.

The processing server 102 may generate the mirror blockchain transaction and include the mirror blockchain transaction in a new block that is generated thereby. The new block may then be confirmed and added to the secondary blockchain using traditional methods and systems. Once the processing server 102 confirms that the mirror blockchain transaction has been added to the secondary blockchain, the processing server 102 may proceed with the final step in the conversion process by initiating a transfer of the determined amount of fiat currency to a transaction account associated with the entity that requested the transfer. In some cases, the transaction account may be identified by the requesting entity during registration or during the process of verifying the requesting entity's identity. In other cases, the processing server 102 may request information for the transaction account from the receiver device 106 once the mirror blockchain transaction is confirmed. The transfer may be of the determined amount of fiat currency from a transaction account specified by the processing server 102 to the transaction account of the requesting entity. For example, the requesting entity may have a transaction account issued thereto by a financial institution 112. The financial institution 112 may provide the requesting entity with a transaction account number, routing information, or other data used for the transfer of fiat currency to that transaction account. The requesting entity may provide such data to the processing server 102 for the transfer of fiat currency. The transfer may be performed using any suitable method, such as a wire transfer, automated clearing house transfer, etc.

In some cases, the processing server 102 may utilize multiple transaction accounts, where each may be associated with a blockchain wallet and/or address used to receive digital asset conversion requests in the primary blockchain. For example, the processing server 102 may have a mirrored transaction account for each blockchain wallet it utilizes in the primary blockchain, along with a mirrored blockchain wallet in the secondary blockchain. In other embodiments, the processing server 102 may use a single transaction account for all fiat currency transfers. Once the transfer is complete, the requesting entity may then have their fiat currency, while the processing server 102 or other associated entity may have control of the corresponding digital assets in the primary blockchain.

The methods and systems discussed herein provide for efficient and secure conversion of digital assets to fiat currency. Mirrored accounting is used to establish an immutable record of all digital asset conversions using a secondary blockchain, which ensures full accountability and transparency. By utilizing the secondary blockchain, the immutable record ensures that any transfer can be audited and that there can be no fraud in the process. This is further secured by requiring verification of the entity that requests the digital asset conversion, to ensure that only an authorized (e.g., and registered, as required) entity is performing the conversion and will be receiving fiat currency. Thus, by using mirrored accounting and entity verification, any entity participating in the system 100 can be assured of a secure and trustworthy conversion of their digital assets with a significant improvement over legacy systems.

Processing Server

Figure 2:
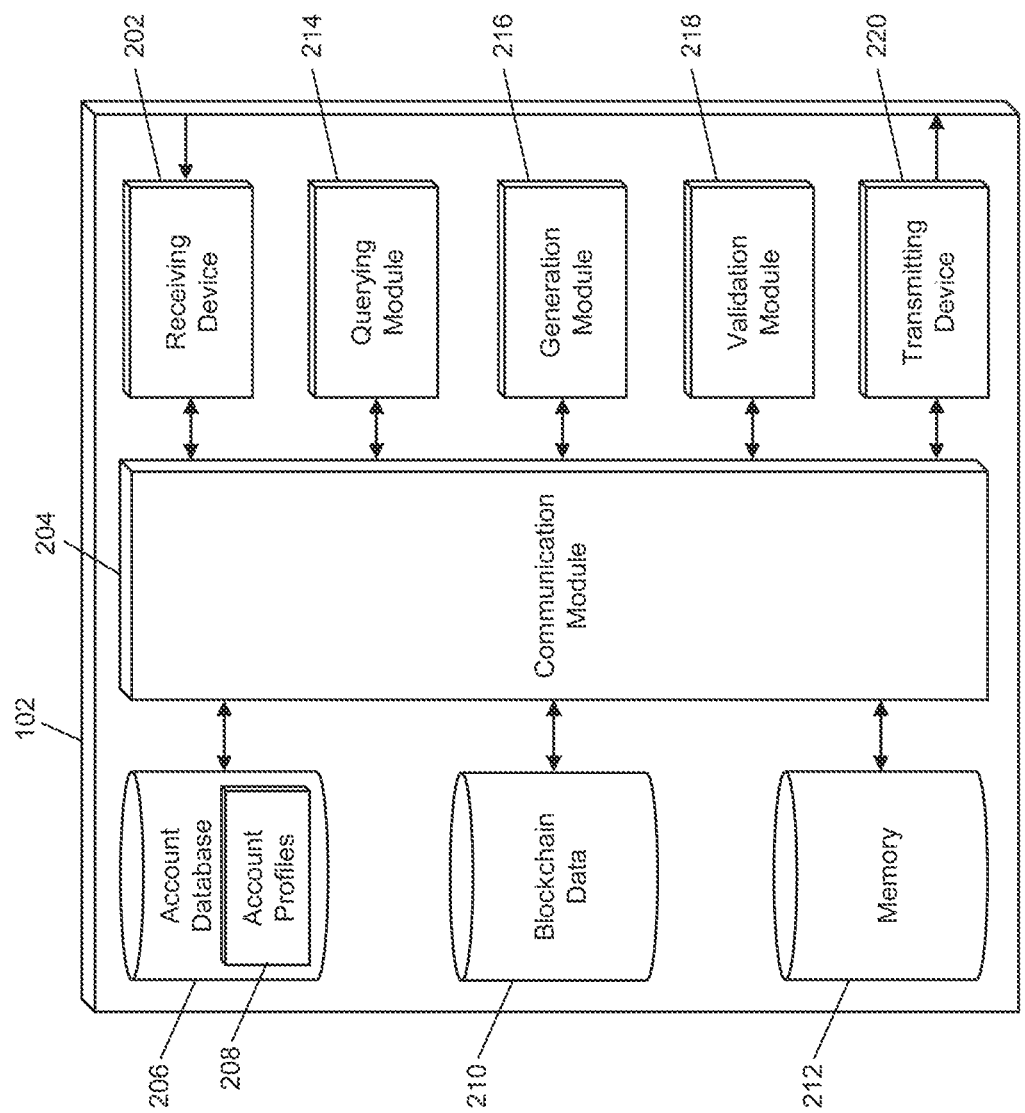
FIG. 2 is a block diagram illustrating the processing server of the system of FIG. 1 for conversion of digital assets to fiat currency in accordance with exemplary embodiments.

FIG. 2 illustrates an embodiment of the processing server 102 in the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 500 illustrated in FIG. 5 and discussed in more detail below may be a suitable configuration of the processing server 102.

The processing server 102 may include a receiving device 202. The receiving device 202 may be configured to receive data over one or more networks via one or more network protocols. In some instances, the receiving device 202 may be configured to receive data sender devices 104, receiver devices 106, blockchain nodes 110, financial institutions 112, third parties 114, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by sender devices 104, receiver devices 106, and/or blockchain nodes 110 that may be superimposed or otherwise encoded with new transactions for confirmation, confirmed blockchain transactions, new blocks for confirmation, confirmed blocks for addition to the blockchain, messages regarding block confirmations, blockchain hash values, etc. The receiving device 202 may also be configured to receive data signals electronically transmitted by sender devices 104 and/or receiver devices 106, which may be superimposed or otherwise encoded with registration data, transaction account information, and other data used in digital asset conversions as discussed above. The receiving device 202 may also be configured to receive data signals electronically transmitted by third parties 114, which may be superimposed or otherwise encoded with identity verification data or results, fiat currency amounts, fiat currency exchange rates, etc.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 214, generation module 216, validation module 218, etc. As used herein, the term "module" may be software or hardware particularly programmed to receive an input, perform one or more processes using the input, and provides an output. The input, output, and processes performed by various modules will be apparent to one skilled in the art based upon the present disclosure.

The processing server 102 may include an account database 206. The account database 206 may be configured to store a plurality of account profiles 208 using a suitable data storage format and schema. The account database 206 may be a relational database that utilizes structured query language for the storage, identification, modifying, updating, accessing, etc. of structured data sets stored therein. Each account profile 208 may be a structured data set configured to store data related to one or more registered accounts. For instance, an account profile 208 may be associated with a blockchain wallet for the primary blockchain and may include identifiers and/or keys for the associated blockchain wallet as well as data for any mirrored accounts. For example, an account profile 208 may include keys, addresses, and/or identifiers for a mirrored blockchain wallet for the secondary blockchain, account identifiers and other data for a transaction account used for the receipt or transfer of fiat currency, etc.

The processing server 102 may also include blockchain data 210, which may be stored in a memory 212 of the processing server 102 or stored in a separate area within the processing server 102 or accessible thereby. The blockchain data 210 may include a secondary blockchain, which may be comprised of a plurality of blocks, and, in some cases, may also include a primary blockchain associated with the blockchain network 108. In some cases, the blockchain data 210 may further include any other data associated with the blockchain and management and performance thereof, such as block generation algorithms, digital signature generation and confirmation algorithms, communication data for blockchain nodes 110, etc.

The processing server 102 may also include a memory 212. The memory 212 may be configured to store data for use by the processing server 102 in performing the functions discussed herein, such as public and private keys, symmetric keys, etc. The memory 212 may be configured to store data using suitable data formatting methods and schema and may be any suitable type of memory, such as read-only memory, random access memory, etc. The memory 212 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 212 may be comprised of or may otherwise include a relational database that utilizes structured query language for the storage, identification, modifying, updating, accessing, etc. of structured data sets stored therein. The memory 212 may be configured to store, for example, cryptographic keys, salts, nonces, communication information, address generation and validation algorithms, digital signature generation and validation algorithms, hashing algorithms for generating reference values, rules regarding generation of new blocks and block headers, hash values, mirrored transaction account and blockchain wallet data, rules and regulations for digital asset conversions, exchange rates, etc.

The processing server 102 may include a querying module 214. The querying module 214 may be configured to execute queries on databases to identify information. The querying module 214 may receive one or more data values or query strings and may execute a query string based thereon on an indicated database, such as the memory 212 of the processing server 102 to identify information stored therein. The querying module 214 may then output the identified information to an appropriate engine or module of the processing server 102 as necessary. The querying module 214 may, for example, execute a query on the account database 206 to identify an account profile 208 associated with a blockchain wallet that made a transfer in the primary blockchain to initiate a digital asset conversion, such as to identify mirrored account information for conducting a secondary blockchain transaction and the transfer of fiat currency.

The processing server 102 may also include a generation module 216. The generation module 216 may be configured to generate data for use by the processing server 102 in performing the functions discussed herein. The generation module 216 may receive instructions as input, may generate data based on the instructions, and may output the generated data to one or more modules of the processing server 102. For example, the generation module 216 may be configured to generate new blockchain data values, new block headers, Merkle roots, new blocks, and other data for operation of the blockchain, as well as generate fiat currency amounts using exchange rate data, generate new cryptographic key pairs during account registration, etc.

The processing server 102 may also include a validation module 218. The validation module 218 may be configured to perform validations for the processing server 102 as part of the functions discussed herein. The validation module 218 may receive instructions as input, which may also include data to be used in performing a validation, may perform a validation as requested, and may output a result of the validation to another module or engine of the processing server 102. The validation module 218 may, for example, be configured to confirm blockchain transactions by analyzing blockchain data values in the blockchain to ensure that a blockchain wallet is authorized to use the transaction outputs included in the new transaction submission and that the transaction outputs have not been previously used to transfer currency in another transaction. In some cases, the validation module 218 may also be configured to verify the identity of a requesting entity, such as using traditional know your customer methods or other suitable verification and authentication methods.

The processing server 102 may also include a transmitting device 220. The transmitting device 220 may be configured to transmit data over one or more networks via one or more network protocols. In some instances, the transmitting device 220 may be configured to transmit data to sender devices 104, receiver devices 106, blockchain nodes 110, financial institutions 112, third parties 114, and other entities via one or more communication methods, local area networks, wireless area networks, cellular communication, Bluetooth, radio frequency, the Internet, etc. In some embodiments, the transmitting device 220 may be comprised of multiple devices, such as different transmitting devices for transmitting data over different networks, such as a first transmitting device for transmitting data over a local area network and a second transmitting device for transmitting data via the Internet. The transmitting device 220 may electronically transmit data signals that have data superimposed that may be parsed by a receiving computing device. In some instances, the transmitting device 220 may include one or more modules for superimposing, encoding, or otherwise formatting data into data signals suitable for transmission.

The transmitting device 220 may be configured to electronically transmit data signals to blockchain nodes 110 that are superimposed or otherwise encoded with new blockchain data values, new blocks for confirmation, confirmed blocks, messages regarding block or transaction confirmations, hash values, and other data used in the operation and management of blockchains. The transmitting device 220 may also be configured to electronically transmit data signals to sender devices 104 and/or receiver devices 106, which may be superimposed or otherwise encoded with confirmation requests, notifications regarding transaction processing, requests for registration data, account identification requests, fiat currency determinations, etc. The transmitting device 220 may also be configured to electronically transmit data signals to financial institutions 112, such as may be superimposed or otherwise encoded with fiat currency transfer requests or data associated therewith. The transmitting device 220 may also be configured to electronically transmit data signals to third parties 114 that may be superimposed or otherwise encoded with entity verification requests, fiat currency determination requests, exchange rate requests, etc.

Digital Asset Conversion Processing Flow

Figure 3A:
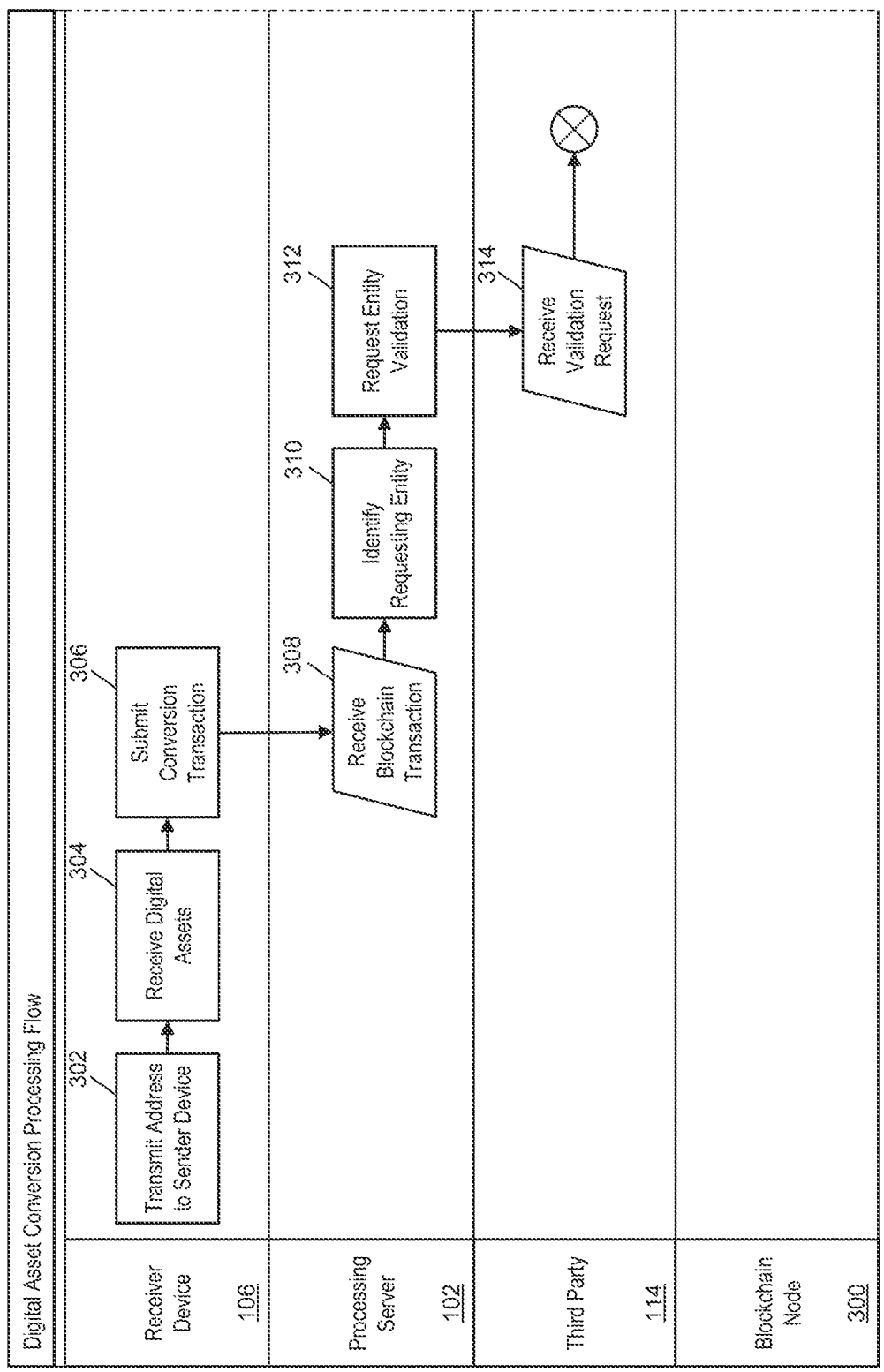
FIGS. 3A-3C are a flow diagram illustrating a process for digital asset conversion processing in accordance with exemplary embodiments.
Figure 3B:
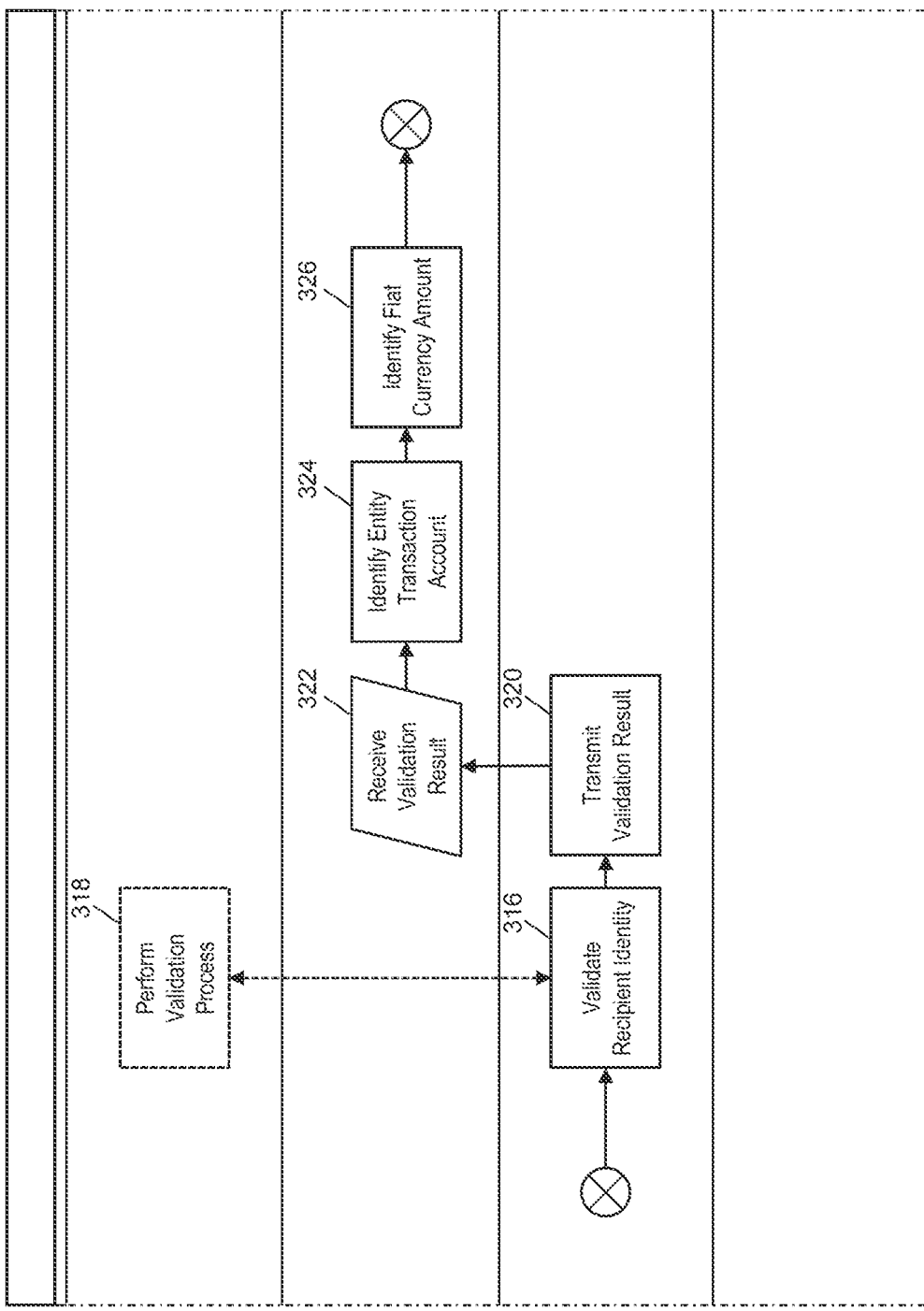
Figure 3C:
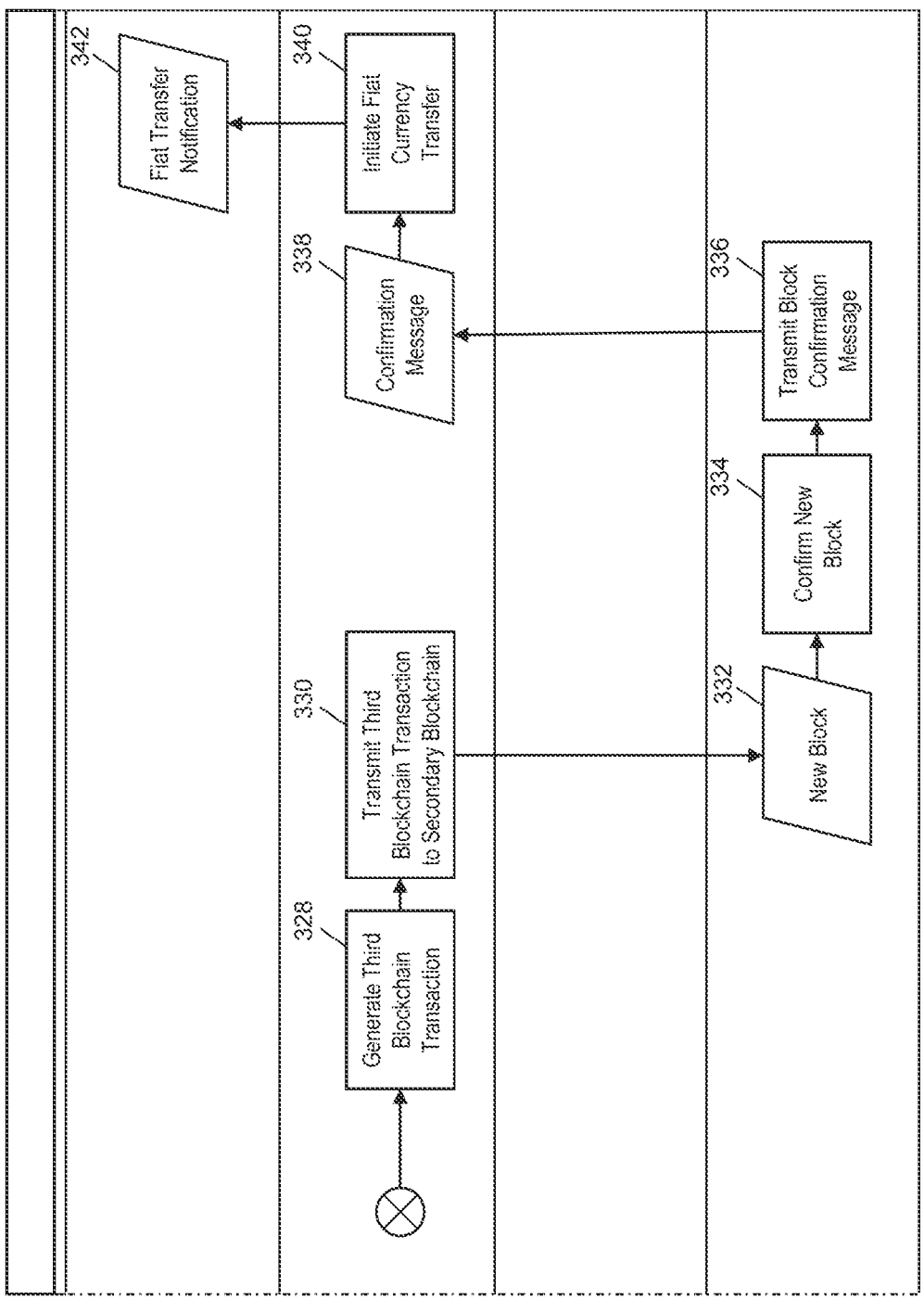

FIGS. 3A-3C illustrate a digital asset conversion processing flow for the conversion of digital assets to fiat currency in the system 100 via the use of mirrored accounting and a secondary blockchain.

In step 302, the receiver device 106 may generate a blockchain address using the public key of its blockchain wallet and transmit the blockchain address to a sender device 104 for the collection of payment using a digital asset in a first blockchain. The sender device 104 may then submit a blockchain transaction to the first blockchain (e.g., via a blockchain node 110 in the blockchain network 108), which may result in, in step 304, the receiver device 106 receiving (e.g., via its blockchain wallet) digital assets as payment from the sender device 104. The receiver device 106 may then have possession of those digital assets on the first blockchain through the output of the first transaction. In step 306, the receiver device 106 may submit a second blockchain transaction to the primary blockchain (e.g., to a blockchain node 110 in the blockchain network 108) for payment of an amount of digital assets to a blockchain address associated with digital asset conversion, such as may be provided by the processing server 102 (e.g., publicly or to the receiver device 106 during a registration process). The second transaction may utilize the unspent transaction output from the first transaction, and any other unspent transaction outputs as desired by the requesting entity associated with the receiver device 106, to transfer a desired amount of digital assets to the blockchain address associated with digital conversion. The second blockchain transaction may be submitted to the blockchain network 108 and added to the primary blockchain using traditional methods and systems.

In step 308, the receiving device 202 of the processing server 102 may receive transaction data for the second blockchain transaction, such as from a blockchain node 110 either directly or within a block provided by thereby. The transaction data may include at least the blockchain address, digital asset amount transferred thereto, and an identifier associated with the payer, also referred to herein as a "payer identifier." In step 310, the processing server 102 may identify the entity requesting the digital asset conversion. For instance, the querying module 214 of the processing server 102 may execute a query on the account database 206 of the processing server 102 to identify an account profile 208 that includes the payer identifier, which may have an entity identifier or other data associated with the requesting entity. In step 312, the transmitting device 220 of the processing server may electronically transmit the entity identifier, payer identifier, or other data to a third party 114 for validation of the requesting entity using a suitable communication network and method.

In step 314, the third party 114 may receive the validation request. In step 316, the third party 114 may validate the identity of the requesting entity as being genuine, such as to ensure that the requesting entity is the proper entity associated with the receiver device 106 and registered with the processing server 102, or to otherwise ensure that fraud is not being perpetuated using any suitable method as will be apparent to persons having skill in the relevant art. In some embodiments, the third party 114 may, in step 318, contact the receiver device 106 as part of the validation process to verify the requesting entity and the authenticity thereof. In some instances, the validation may include ensuring that the receiver device 106 is not compromised. In step 320, the third party 114 may transmit a result of the validation process (e.g., that the requesting entity is who they purport to be or who was registered to the receiver device 106 previously) to the processing server 102. In step 322, the receiving device 202 of the processing server 102 may receive the validation result from the third party 114.

In step 324, the processing server 102 may identify the transaction account to which the requesting entity would like the fiat currency transferred. Such an identification may be performed by identify transaction account information in the previously identified account profile 208 or may, in some cases, include requesting such information from the receiver device 106 by the transmitting device 202. In step 326, the processing server 102 may determine the fiat currency amount for the transfer, which may be based on the digital asset amount included in the second blockchain transaction. In some instances, the generation module 216 of the processing server 102 may determine the fiat currency amount by applying an exchange rate (e.g., stored in the memory 212) to the digital asset amount. In other instances, a third party 114 may be used where the transmitting device 220 of the processing server 102 may electronically transmit the digital asset amount thereto and receive, by the receiving device 202, the fiat currency amount, or may request an exchange rate from the third party 114 for use by the generation module 216 in determining the fiat currency amount.

In step 328, the generation module 216 of the processing server 102 may generate a third blockchain transaction to be added to the secondary blockchain. The third blockchain transaction may include at least the fiat currency amount and mirrored account information for the receiver device 106 and/or requesting entity. In some instances, the third blockchain transaction may further include at least one of: mirrored account information for the blockchain address used as recipient in the second blockchain transaction, transaction account information, the digital asset amount, exchange rate data, entity verification results, etc. In step 330, the transmitting device 220 of the processing server 102 may electronically transmit the generated third blockchain transaction to another blockchain node, e.g., the blockchain node 110 that participates in the secondary blockchain.

In step 332, the blockchain node 300, or any node on the secondary blockchain, may receive the third blockchain transaction and, in step 334, may generate a new block that includes the third blockchain transaction. The new block may be confirmed the using traditional methods and systems, such as ensuring that the reference values are correct. In step 336, the blockchain node 300 may electronically transmit a confirmation message to the processing server 102, which may indicate that the new block is confirmed. In step 338, the receiving device 202 of the processing server 102 may receive the confirmation message from the blockchain node 300. The new block may then be added to the secondary blockchain, which may result in the third blockchain transaction being successfully added to the secondary blockchain. In some cases, the processing server 102 may be required to receive a confirmation message from a majority or other specified amount of other blockchain nodes 300 for the new block to be added to the blockchain. In step 340, the transmitting device 220 of the processing server 102 may then initiate the transfer of the determined amount of fiat currency to the transaction account specified by the requesting entity, such as by submitting a request to a financial institution 112 or other entity that can affect the transfer for the provided amount of fiat currency from a transaction account specified by the processing server 102 to the requesting entity's transaction account. In step 342, the requesting entity may receive a notification via the receiver device 106 that the fiat currency transfer was completed successfully, such as may be provided by the processing server 102, their financial institution 112, and entity that performed the transfer, etc.

Exemplary Method for Conversion of Digital Assets

Figure 4:
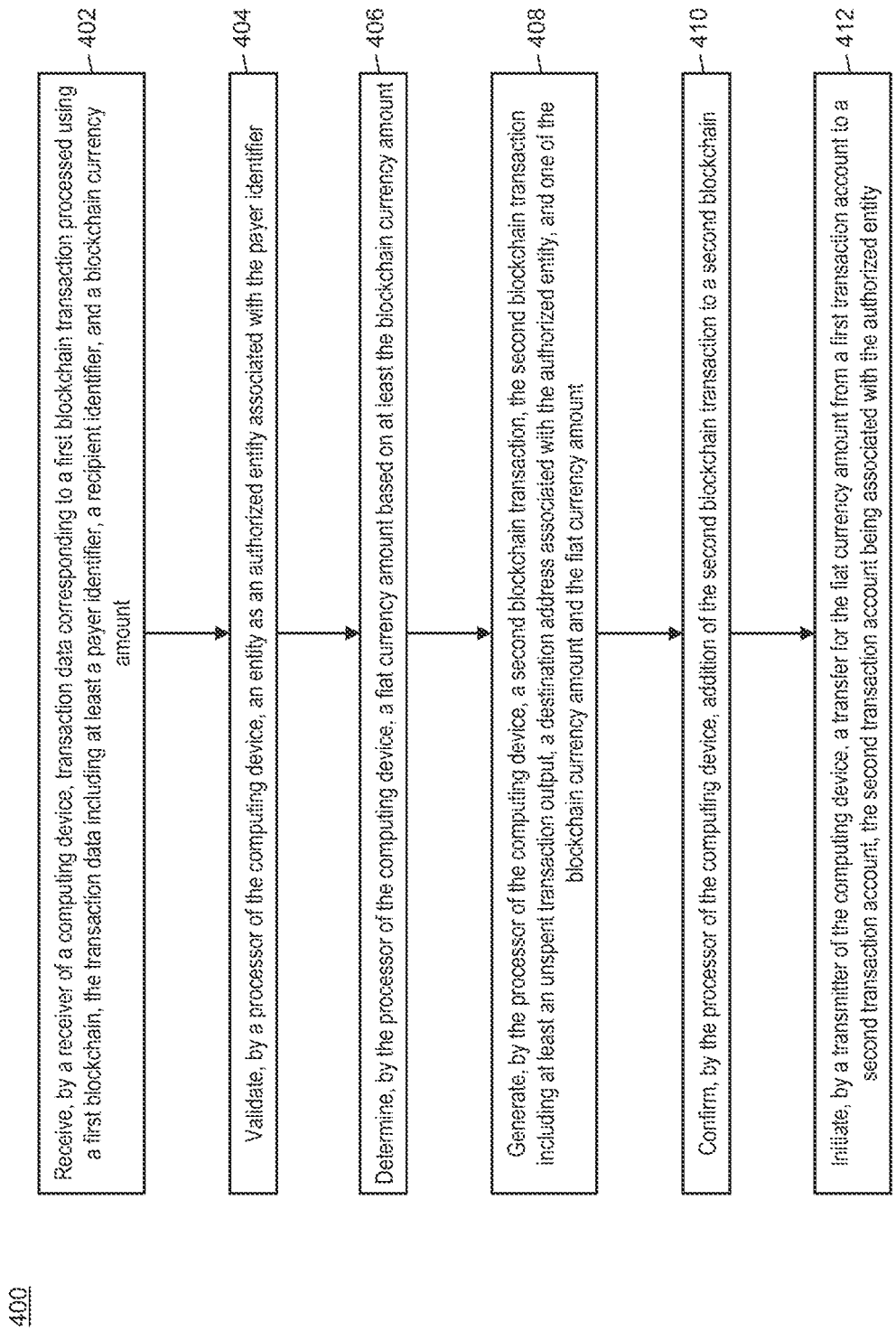
FIG. 4 is a flow chart illustrating an exemplary method for conversion of digital assets to fiat currency using a secondary blockchain and mirrored accounting in accordance with exemplary embodiments.

FIG. 4 illustrates a method 400 for the conversion of digital assets to fiat currency using a secondary blockchain and mirrored accounting.

In step 402, transaction data corresponding to a first blockchain transaction processed using a first blockchain may be received by a receiver (e.g., receiving device 202) of a computing device (e.g., processing server 102), the transaction data including at least a payer identifier, a recipient identifier, and a blockchain currency amount. In step 404, an entity may be validated by a processor (e.g., validation module 218) of the computing device as an authorized entity associated with the payer identifier. In step 406, a fiat currency amount may be determined by the processor (e.g., generation module 216) of the computing device based on at least the blockchain currency amount.

In step 408, a second blockchain transaction may be generated by the processor (e.g., generation module 216) of the computing device, the second blockchain transaction including at least an unspent transaction output, a destination address associated with the authorized entity, and one of the blockchain currency amount and the fiat currency amount. In step 410, addition of the second blockchain transaction to a second blockchain may be confirmed by the processor (e.g., validation module 218) of the computing device. In step 412, a transfer for the first currency amount may be initiated by a transmitter (e.g., transmitting device 220) of the computing device from a first transaction account to a second transaction account, the second transaction account being associated with the authorized entity.

In one embodiment, the first blockchain may be a public blockchain, and the second blockchain may be a permissioned blockchain. In some embodiments, validating the entity as an authorized entity may include: transmitting, by the transmitter of the computing device, at least the payer identifier or a secondary identifier associated with the recipient identifier to a third party (e.g., third party 114); and receiving, by the receiver of the computing device, an indication of a successful validation of the authorized entity from the third party. In one embodiment, the method 400 may further include identifying, by the processor of the computing device, the second transaction account based on the payer identifier.

In some embodiments, the method 400 may also include: storing, in a memory (e.g., memory 212) of the computing device, a private key of a cryptographic key pair; and generating, by the processor (e.g., generation module 216) of the computing device, a digital signature using the private key, wherein the digital signature is included in the second blockchain transaction. In a further embodiment, the private key may be associated with the first transaction account. In one embodiment, the method 400 may further include generating, by the processor (e.g., generation module 216) of the computing device, a new block for the second blockchain, the new block including at least a block header and one or more new blockchain transactions, the one or more new blockchain transactions including at least the second blockchain transaction. In a further embodiment, the method 400 may even further include transmitting, by the transmitter of the computing device, the generated new block to one or more nodes in a blockchain network, wherein confirming addition of the second blockchain transaction to the second blockchain includes receiving, by the receiver of the computing device, a confirmation message from a majority of the one or more nodes in the blockchain network.

Computer System Architecture

FIG. 5 illustrates a computer system 500 in which embodiments of the present disclosure, or portions thereof, may be implemented as computer-readable code. For example, the processing server 102 of FIGS. 1 and 2 may be implemented in the computer system 500 using hardware, non-transitory computer readable media having instructions stored thereon, or a combination thereof and may be implemented in one or more computer systems or other processing systems. Hardware may embody modules and components used to implement the methods of FIGS. 3A-3C and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general-purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3A-3C and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for conversion of digital assets to fiat currency using a secondary blockchain and mirrored accounting. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for conversion of digital assets to fiat currency using a secondary blockchain and mirrored accounting, comprising:
    receiving, by a processing server, transaction data corresponding to a first blockchain transaction processed using a first blockchain, the transaction data including at least a payer identifier, a first blockchain address, and a blockchain currency amount;
    executing, by a querying module of the processing server, a query on an account database stored on the processing server to identify an account profile associated with the payer identifier, the account profile including a second blockchain address associated with a second blockchain and a transaction account;
    identifying, by the querying module of the processing server, the account profile associated with the payer identifier;
    determining, by a generation module of the processing server, a fiat currency amount based on at least the blockchain currency amount;
    generating, by the generation module of the processing server, a second blockchain transaction, the second blockchain transaction including at least an unspent transaction output, the second blockchain address, and one of the blockchain currency amount and the fiat currency amount;
    transmitting, by the processing server, the second blockchain transaction to a second blockchain; and
    initiating, by the processing server, a transfer for the fiat currency amount from a first transaction account to the transaction account included in the identified account profile.

2. The method of claim 1, wherein
    the first blockchain is a public blockchain, and
    the second blockchain is a permissioned blockchain.

3. The method of claim 1, further comprising:
    identifying the second transaction account based on the payer identifier.

4. The method of claim 1, further comprising:
    storing a private key of a cryptographic key pair; and
    generating a digital signature using the private key, wherein the digital signature is included in the second blockchain transaction.

5. The method of claim 4, wherein the private key is associated with the first transaction account.

6. The method of claim 1, further comprising:
    generating a new block for the second blockchain, the new block including at least a block header and one or more new blockchain transactions, the one or more new blockchain transactions including at least the second blockchain transaction.

7. The method of claim 6, further comprising:
    transmitting the generated new block to one or more nodes in a blockchain network, wherein
    confirming addition of the second blockchain transaction to the second blockchain includes receiving a confirmation message from a majority of the one or more nodes in the blockchain network.

8. The method of claim 1, further comprising:
    receiving, prior to receiving the transaction data, a request for the first blockchain address from a computing device; and
    generating the first blockchain address using a public key of a blockchain wallet associated with the first blockchain.

9. The method of claim 1, wherein the second blockchain address is a mirror account of the first blockchain address.

10. A system for conversion of digital assets to fiat currency using a secondary blockchain and mirrored accounting, comprising:
    a computing device including
        a receiver receiving transaction data corresponding to a f first blockchain transaction processed using a first blockchain, the transaction data including at least a payer identifier, a first blockchain address, and a blockchain currency amount,
    a non-transitory computer-readable storage medium having program instructions embodied therewith, the program instructions executable by a processor to cause the processor to perform the steps of:
        executing, by a querying module of the processor, a query on an account database stored on the processing server to identify an account profile associated with the payer identifier, the account profile including a second blockchain address associated with a second blockchain and a transaction account;
        identifying, by the querying module of the processor, the account profile associated with the payer identifier;
        determining, by a generation module of the processor, a fiat currency amount based on at least the blockchain currency amount,
        generating, by the generation module of the processor, a second blockchain transaction, the second blockchain transaction including at least an unspent transaction output, the second blockchain address, and one of the blockchain currency amount and the fiat currency amount, and
        transmitting, by the processor, the second blockchain transaction to a second blockchain, and
        initiating, by the processor, a transfer for the fiat currency amount from a first transaction account to the transaction account included in the identified account profile.

11. The system of claim 10, wherein
    the first blockchain is a public blockchain, and
    the second blockchain is a permissioned blockchain.

12. The system of claim 10, wherein the processor of the computing device identifies the second transaction account based on the payer identifier.

13. The system of claim 10, wherein
    the computing device further includes a memory storing a private key of a cryptographic key pair, and the processor of the computing device generates a digital signature using the private key, wherein the digital signature is included in the second blockchain transaction.

14. The system of claim 13, wherein the private key is associated with the first transaction account.

15. The system of claim 10, further comprising:

the transmitter of the computing device transmits the second blockchain transaction to one or more nodes in the second blockchain network, and confirming addition of the second blockchain transaction to the second blockchain includes receiving, by the receiver of the computing device, a confirmation message from a majority of the one or more nodes in the second blockchain network.

16. The system of claim 10, wherein the processor of the computing is one of the one or more nodes in the second blockchain network.

17. The method of claim 10, further comprising:

receiving, prior to receiving the transaction data, a request for the first blockchain address from a computing device; and generating the first blockchain address using a public key of a blockchain wallet associated with the first blockchain.

18. The method of claim 10, wherein the second blockchain address is a mirror account of the first blockchain address.

\* \* \* \* \*